United States Patent
Sokolov

(10) Patent No.: US 8,214,558 B1
(45) Date of Patent: Jul. 3, 2012

(54) SYSTEMS AND METHODS FOR MANAGING ACCESS TO A PERIPHERAL DEVICE

(75) Inventor: Maksim Sokolov, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 132 days.

(21) Appl. No.: 12/707,551

(22) Filed: Feb. 17, 2010

(51) Int. Cl.
*G06F 3/00* (2006.01)
*G06F 21/00* (2006.01)

(52) U.S. Cl. .............................. 710/39; 711/6
(58) Field of Classification Search ............. 710/39; 370/241; 711/6
See application file for complete search history.

(56) References Cited

U.S. PATENT DOCUMENTS

| | | | | |
|---|---|---|---|---|
| 2007/0201372 A1* | 8/2007 | Tong et al. | ..................... | 370/241 |
| 2010/0250824 A1* | 9/2010 | Belay | ................. | 711/6 |

OTHER PUBLICATIONS

Parallels Desktop for Mac—User Guide, 2007, Parallels Software International, Inc.*
VMMware ESX and VMware ESXi, 2009, VMWare.*
Website: http://www.csm.ornl.gov/~engelman/publications/vallee08 system.ppt.pdf, *System-level Virtualization for High Performance Computing*, PDP-Toulouse, France—Feb. 2008 (26 pgs.).
Website: http://opensolaris.org/jive/thread.jspa?messageID=385945, *Thread: Zone Isolation & Host Protection*, OpenSolaris Forum, Jun. 10, 2009 (3 pgs.).

* cited by examiner

*Primary Examiner* — Hyun Nam
(74) *Attorney, Agent, or Firm* — Holland & Hart LLP

(57) ABSTRACT

A computer-implemented method for managing access to a peripheral device is described. A request is received from an operating system to interface with a peripheral device. The operating system requesting to interface with the peripheral device is analyzed. A determination is made as to whether the operating system is a host operating system based on the analysis of the operating system. The operating system is prevented from interfacing with the peripheral device if the operating system is a host operating system.

20 Claims, 9 Drawing Sheets

SYSTEMS AND METHODS FOR MANAGING ACCESS TO A PERIPHERAL DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. For example, users demand improvements in the functionality of computing devices. For example, devices may be connected to a computer in order to increase the functionality of the computer. These devices may provide an increased ability for a user to interface with the computer.

In some instances, certain devices may threaten or harm various functions of a computer. For example, a device may include harmful data that may infect or damage a computer when the device is connected to the computer. As a result, benefits may be realized by providing systems and methods for managing access to peripheral devices connected to a computing device.

SUMMARY

According to at least one embodiment, a computer-implemented method for managing access to a peripheral device is described. A request is received from an operating system to interface with a peripheral device. The operating system requesting to interface with the peripheral device is analyzed. A determination is made as to whether the operating system is a host operating system based on the analysis of the operating system. The operating system is prevented from interfacing with the peripheral device if the operating system is a host operating system.

In one embodiment, the operating system may be allowed to interface with the peripheral device if the operating system is a process running on a host operating system. In one example, a plurality of requests to interface with the peripheral device may be received from a plurality of operating systems. In one embodiment, data are stored on the peripheral device. The plurality of requests may be requests to have read and write capabilities for the data stored on the peripheral device. A single operating system may be selected to have read and write capabilities for the data stored on the peripheral device. In one configuration, non-selected operating systems may be allowed to have read capabilities for the data stored on the peripheral device. One or more peripheral devices may be selected to interface with a host operating system. In addition, one or more peripheral devices may be selected to become accessible to one or more guest operating systems upon connecting the one or more peripheral devices to a connection port of a computing device.

A computer system configured to manage access to a peripheral device is also described. The computer system may include a processor and memory in electronic communication with the processor. The computer system may also include a management module configured to receive a request from an operating system to interface with a peripheral device, and analyze the operating system requesting to interface with the peripheral device. The management module may also be configured to determine whether the operating system is a host operating system based on the analysis of the operating system, and prevent the operating system from interfacing with the peripheral device if the operating system is a host operating system.

A computer-program product for managing access to a peripheral device is also described. The computer-program product may include a computer-readable medium having instructions thereon. The instructions may include code programmed to receive a request from an operating system to interface with a peripheral device, and code programmed to analyze the operating system requesting to interface with the peripheral device. The instructions may also include code programmed to determine whether the operating system is a host operating system based on the analysis of the operating system, and code programmed to prevent the operating system from interfacing with the peripheral device if the operating system is a host operating system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
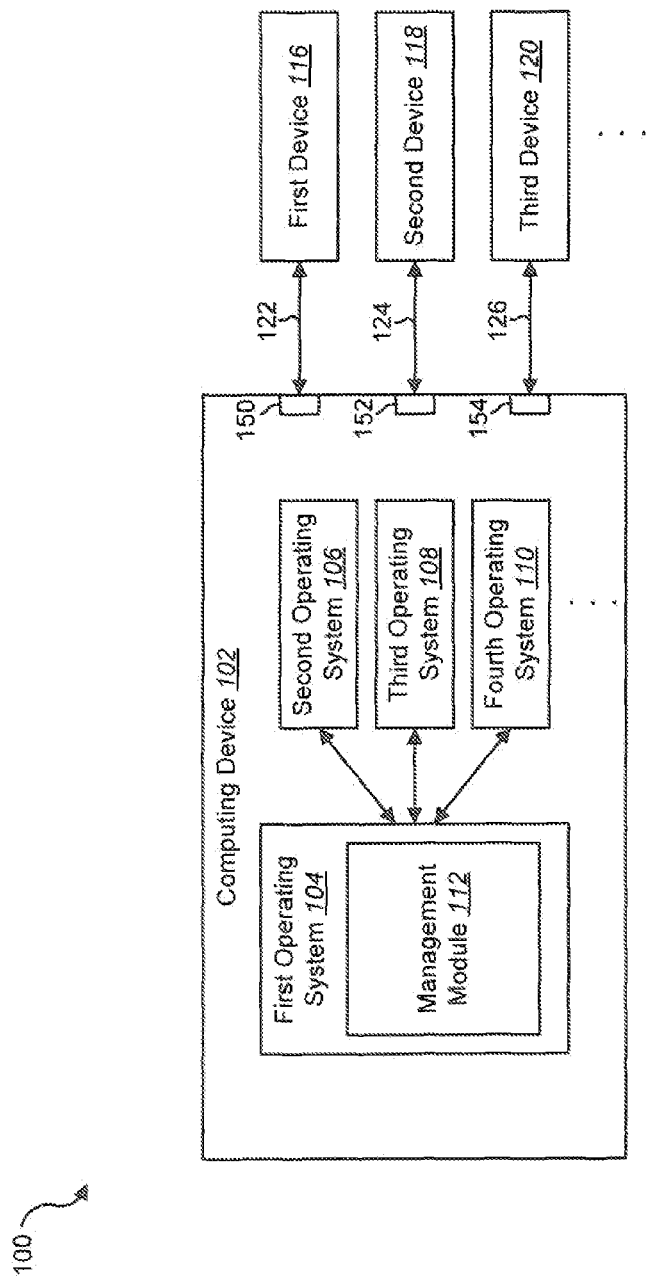
FIG. 1 is a block diagram illustrating one embodiment of a computing device with a management module to implement the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In one configuration, an operating system may be installed on a computer. An operating system may serve as an interface between hardware attached to the computer and a user of the computer. In one example, a host operating system (host OS) may run on the computer. The host OS may act as a host for computing applications that may run on the computer. An example of a computing application hosted by the host OS may be a guest operating system (guest OS).

A guest OS may be an operating system that is installed on the computer, in addition to the host OS, as a virtual machine (VM). A VM may be an environment, such as a program or operating system, which may not physically exist, but is created within another environment. For example, a VM may be referred to as a "guest" while the environment it runs within may be referred to as a "host". A single host environment may run multiple VMs at once. In other words, a host OS may host multiple guest OSs. In virtualization, a single computer may run more than one operating system at the same time. One of the main reasons for the use of VMs is to maintain the state of the host OS after initial configuration of the host OS is completed.

A peripheral may be a device attached to the computer. In one embodiment, the primary functionality of a peripheral device may not be dependent on the computer. In other words, a peripheral device may expand the computer's capabilities, while not forming part of the computer's core architecture. Examples of peripheral devices may include printers, scanners, tape drives, microphones, speakers, webcams, cameras, and the like. An operating system (host OS or guest OS) may serve as an interface between a peripheral device attached to the computer and a user of the computer.

When a peripheral device is connected to a computer, a device driver may be installed on the computer. In one configuration, a device driver may be a computer program allowing higher-level computer programs to interact with a hardware device. For example, when a printer device is connected to a computer, a driver (or drivers) for the device may be installed on the computer in order to allow a computer program (such as an operating system) to interact with the printer. The operating system may then provide an interface for the user to interact with the printer connected to the computer.

As mentioned previously, the host OS is the primary operating system installed on a computer. In one embodiment, the host OS is responsible for the management of the resources of a computer (including other programs running on the computer). As a result, modifications to the host OS are to be avoided as modifications to the host OS may impair the efficiency and functionality of the computer. In some instances, peripheral devices may damage or modify the host OS when they are connected to the computer. For example, a peripheral device may contain harmful data that may attack the host OS when the device is connected to the computer. In addition, a driver (or drivers) installed on the computer for a particular peripheral device may also damage or modify the host OS. In one embodiment, the present systems and methods may isolate peripheral devices from the host OS in order to prevent unwanted modifications or damage from occurring to the host OS.

In one configuration, operating systems may be filtered and the access to peripheral devices may be managed so that only guest OSs running on a host OS may have access to those peripheral devices. Filtering and managing the access to the devices may preserve an uncontaminated host OS, and prevent potential threats associated with those peripheral devices (including the installation of the additional device drivers) from modifying the host OS.

As previously mentioned, one of the main purposes for using VMs is to maintain the state of the host OS after the initial configuration of the host OS is completed. When working with VMs (i.e., guest OSs) it is often times needed to provide guest OSs access to peripheral devices connected to the computer (e.g., Universal Serial Bus (USB) thumb drives, printers, existing hard drives, scanners, and the like) without compromising the security and configuration of the host OS.

In one configuration, the present systems and methods may filter the access to peripheral devices by host OSs running on a computer. In one example, the filtering may occur at the driver level. Access to the peripheral devices may be granted only to guest OSs. Previously, when a user of a guest OS desires to use a peripheral device connected to the computer, there may be a set of configuration steps that need to be taken in order to allow access to that device by the guest OS. For example, a user may need to obtain access to an optical medium (e.g., CD, DVD) from the guest OS that is configured to use that particular image file. In addition, a user may need to access a USB flash drive device. This may require the user to manually configure the guest OS, which may pose a security risk for the host OS. In one configuration, a driver-level filter may allow access to peripheral devices only to VMs, which will make the peripheral devices easily available to guest OSs. A driver-level filter process may also preserve the purity and security of the host OS.

FIG. 1 is a block diagram illustrating one embodiment of a computing device 102 with a management module 112 to implement the present systems and methods. In one configuration, the computing device 102 may be a client device, a personal computer (PC), a laptop, a personal digital assistant (PDA), a server, a mobile communications device, or any type of computing device that connects to a peripheral device.

In one example, a first operating system 104 may run on the computing device 102. The first operating system 104 may be a host OS. In one configuration, additional applications (e.g., operating systems, processes, services) may run from the first operating system 104. For example, a second operating system 106, a third operating system 108, and a fourth operating system 110 may each run on (or from) the first operating system 104. The second operating system 106, third operating system 108, and fourth operating system 110 may run as a VM (or guest OS). A virtual environment may be created when the second operation system 106, third operating system 108, or fourth operating system 110 are executed on (or by) the first operating system 104.

In one embodiment, one or more peripheral devices 116, 118, 120 may be connected to the computing device 102 at one or more input ports 150, 152, 154 on the computing device 102. Examples of peripheral devices 116, 118, 120 may include, but are not limited to, a mouse, keyboards, printers, monitors, speakers, modems, scanners, digital cameras, sound cards, video cards, and the like. Connections 122, 124, 126 established between the devices 116, 118, 120 and the ports 150, 152, 154 of the computing device 102 may include, but are not limited to, a USB connection, a firewire connection, an Ethernet connection, a serial connection, and the like.

In one example, a first device 116 may connect to the computing device 102 via a first port 150. A second device 118 and a third device 120 may establish a second connection 124 via a second port 152 and a third connection 126 via a third port 154, respectively, with the computing device 102. The devices 116, 118, 120 may be peripheral to the computing device 102. In other words, the devices 116, 118, 120 may be connected/removed to/from the computing device 102.

In one embodiment, the computing device 102 may include a management module 112. The management module 112 may run as part of the first operating system 104. In one example, the management module 112 may determine which devices 116, 118, 120 are accessible to the various operating systems 104, 106, 108, 110 executing on the computing device 102. In other words, the management module 112 may filter the devices 116, 118, 120 in order to allow or prevent access to the devices by a certain process (such as the second operating system 106, the third operating system 108, and the fourth operating system). One example of a process may be a guest OS. In one configuration, the management module 112 may isolate the first operating system 104 from the devices 116, 118, 120 by preventing the devices 116, 118, 120 from accessing the first operating system 104. Similarly, the management module 112 may isolate the first operating system 104 by preventing the first operating system 104 from accessing the devices 116, 118, 120. As a result, the configurations of the first operating system 104 may remain preserved and unaffected when a peripheral device 116, 118, 120 is connected to the computing device 102. Access to the devices 116, 118, 120 may only be allowed for processes running on or from the first operating system 104, such as the second operating system 106, the third operating system 108, and the fourth operating system 110.

Figure 2:
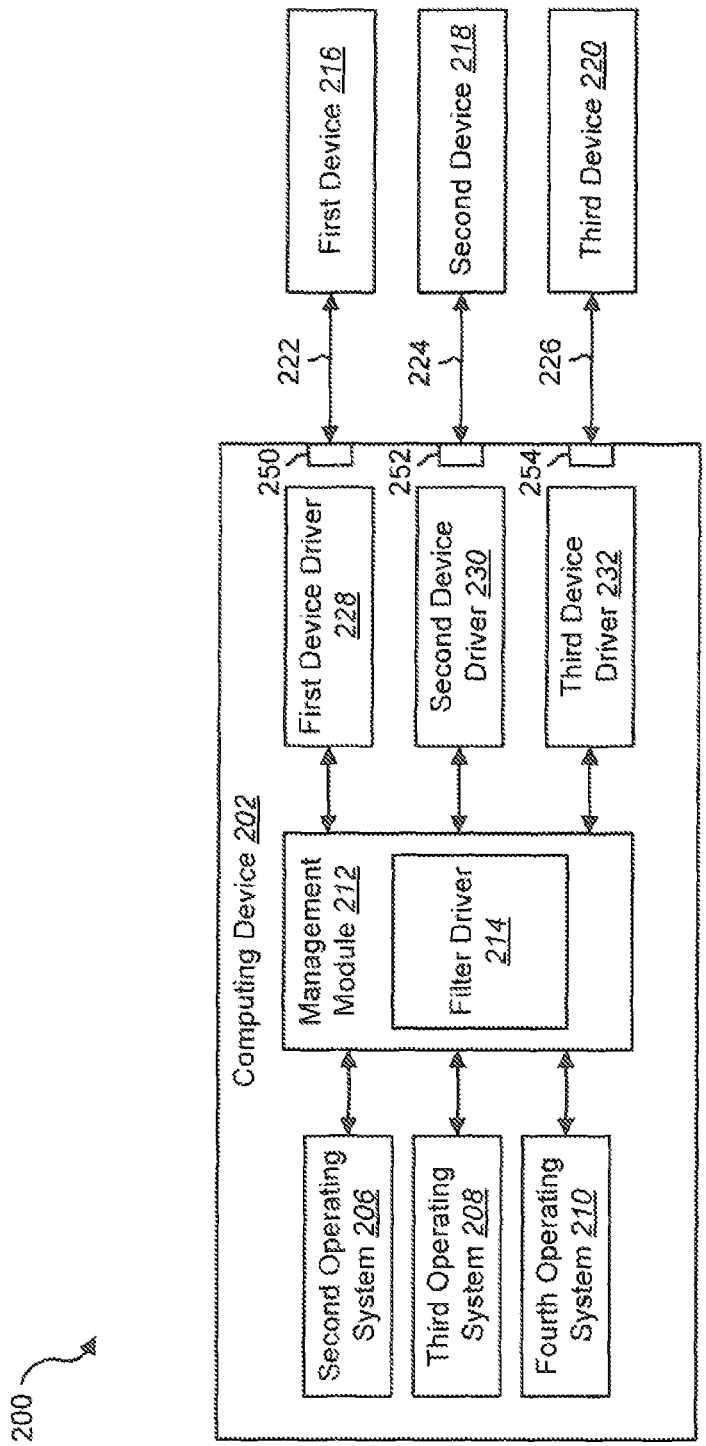
FIG. 2 is a block diagram illustrating a further embodiment of a computing device with a management module that may implement the present systems and methods.

FIG. 2 is a block diagram illustrating a further embodiment of a computing device 202 with a management module 212 that may implement the present systems and methods. In one example, the management module 212 may include a filter driver 214 that may filter access to peripheral devices 216, 218, 220 connected to the computing device 202. In one configuration, the filtering may occur at a driver level. In other words, drivers associated with the devices 216, 218, 220 may be analyzed to determine the type of operating system (host OS or guest OS) attempting to access the devices 216, 218, 220. If a host OS is attempting to interface with a device through a driver, the filter driver 214 may prevent the host OS from accessing the device.

In one embodiment, peripheral devices 216, 218, 220 may establish a connection 222, 224, 226 with the computing device 202 by connecting to various ports 250, 252, 254 on the computing device 202. The connections 222, 224, 226 to the various ports 250, 252, 254 may be USB connections, firewire connections, Ethernet connections, optical connections, and the like.

In one embodiment, a device driver 228, 230, 232 may be initiated when a device 216, 218, 220 is connected to the computing device 202. For example, when a first device 216 establishes a first connection 222 with the computing device 202 via a first port 250, a first device driver 228 may be initiated. The first device driver 228 may be a program that provides an interface between the computing device 202 and the first device 216. The filter driver 214 may analyze each device driver when it is initialized in order to determine which operating system 206, 208, 210 is attempting to interface with the connected device.

In one configuration, the filter driver 214 may prevent the host OS from accessing the peripheral devices 216, 218, 220 connected to the computing device 202. In addition, the filter driver 214 may prevent the devices 216, 218, 220 from accessing the host OS. As a result, the host OS may remain isolated from the peripheral devices 216, 218, 220 that may be connected to the computing device 202. The filter driver 214 may allow guest OSs (such as the second operating system 206, the third operating system 208, and the fourth operating system 210) to access a peripheral device 216, 218, 220 connected to the computing device 202.

Figure 3:
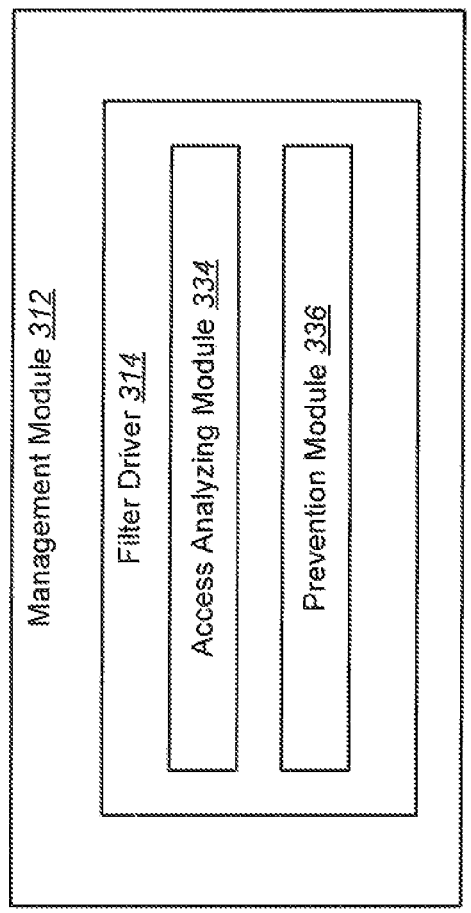
FIG. 3 is a block diagram illustrating one embodiment of a management module.

FIG. 3 is a block diagram illustrating one embodiment of a management module 312 in accordance with the present systems and methods. As previously explained, the management module 312 may be implemented on a computing device in order to implement the present systems and methods.

In one configuration, the management module 312 may include a filter driver 314, as previously explained. The filter driver 314 may include an access analyzing module 334. The access analyzing module 334 may analyze the input/output requests or access request attempts to a peripheral device in order to identify the origin and destination of these requests. The access analyzing module 334 may determine which operating system (e.g., host OS or guest OS) is attempting to interface with a peripheral device. Based upon the analysis by the access analyzing module 334, a prevention module 336 may prevent the operating system from accessing the peripheral device, and may prevent the peripheral device from accessing the operating system. For example, the access analyzing module 334 may determine that a host OS is attempting to interface with a connected peripheral device. The prevention module 336 may prevent the host OS from accessing the peripheral device, and it may also prevent the peripheral device from accessing the host OS. As a result, the filter driver 314 may isolate the host OS from certain peripheral devices connected to the computing device. In some instances, peripheral devices may attempt to damage or threaten the integrity of the host OS. For example, a device driver associated with a threatening peripheral device may alter the configurations of the host OS so that the performance and functionality of the host OS decrease.

If the access analyzing module 334, however, determines that a guest OS is attempting to interface with a peripheral device, the prevention module 336 may not prevent the guest OS from accessing the peripheral device. Similarly, the prevention module 336 may not prevent the peripheral device from interfacing with the guest OS. As a result, a user may interface with a peripheral device via a guest OS while the integrity and configurations of the host OS are preserved.

Figure 4:
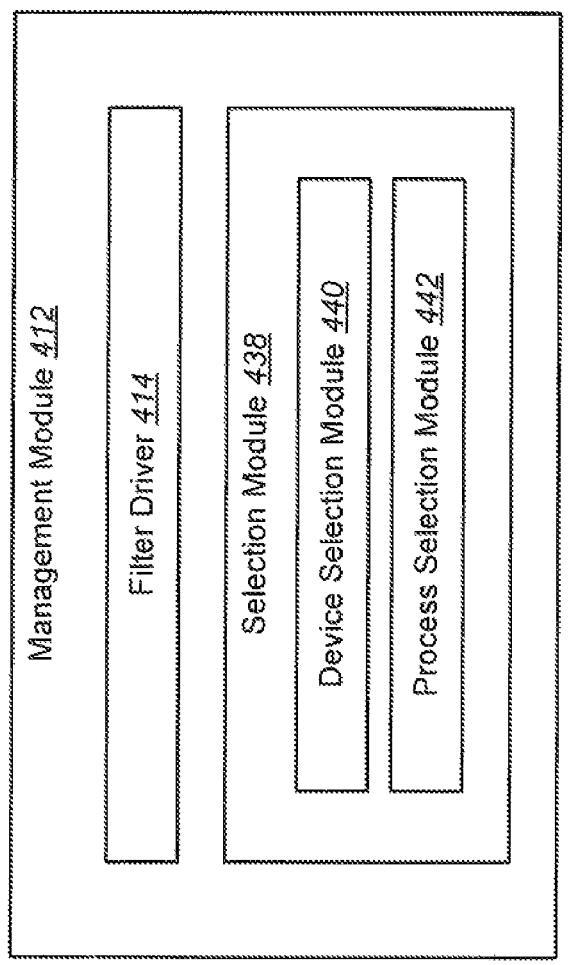
FIG. 4 is another embodiment of a management module.

FIG. 4 is another embodiment of a management module 412. As previously explained, the module 412 may include a filter driver 414. In addition, the management module 412 may include a selection module 438.

In one configuration, the selection module 438 may include a device selection module 440 and a process selection module 442. The selection module 438 may manage which peripheral devices connected to a computing device may be accessed by certain process running on the computing device. For example, the device selection module 440 may select one or more peripheral devices to appear automatically for certain processes when the devices are connected to the computing device. In other words, the device selection module 440 may determine which peripheral devices may be automatically accessed by certain processes running on the computing device when the peripheral devices are attached to the computing device.

In one example, the process selection module 442 may determine which operating systems running on the computing device may access or interface with a peripheral device. For example, multiple operating systems may be running on a computer device. Each of these multiple operating systems may attempt to interface with or access a peripheral device connected to the computing device. For example, the operating systems may request to have read/write capabilities with the data on the peripheral device. The process selection module 442 may select or determine a single operating system to have read/write capabilities and the remaining operating systems to only have read capabilities. Selecting the single operating system that will have read/write capabilities may be a manual selection or an automatic selection. The selection may be based on which operating system receives the greatest amount of user input.

In one embodiment, the process selection module 442 may also determine whether an operating system that is requesting access to a peripheral device is a host OS or a guest OS. If the process selection module 442 determines that the requesting operating system is a host OS, the prevention module 336 may prevent the host OS from accessing the peripheral device. If, however, the process selection module 442 determines that the requesting operating system is a guest OS, the guest OS may be allowed to access the peripheral device.

In addition to selecting guest operating systems, the process selection module 442 may select other types of processes, services, or applications to interface with a peripheral device. For example, an application may be allowed to interface with a USB device that is storing a .doc file. The process selection module 442 may allow the application to open and read the .doc file from the USB device. In one embodiment, the prevention module 336 may prevent the application from saving changes to the .doc file on the USB device.

Figure 5:
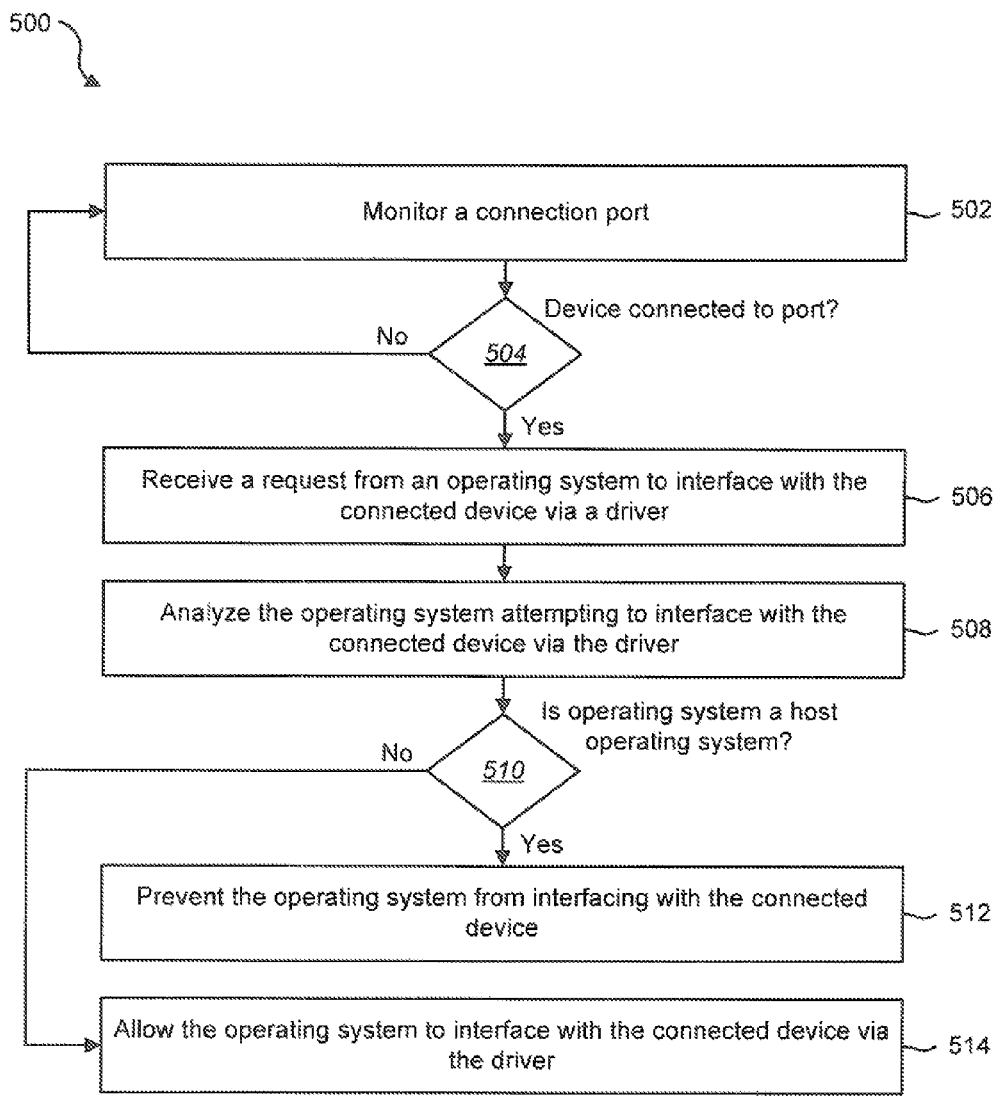
FIG. 5 is a flow diagram illustrating one embodiment of a method for managing the access to a peripheral device.

FIG. 5 is a flow diagram illustrating one embodiment of a method 500 for managing the access to a peripheral device. In one configuration, the method 500 may be implemented by the management module 112.

In one example, a connection port may be monitored 502. A determination 504 may be made as to whether a device is connected to the connection port. If it is determined 504 that the device is not connected to the port, the method 500 may continue to monitor 502 the connection port. If, however, it is determined 504 that a device is connected to the port, a request may be received 506 from an operating system to interface with the connected device via a device driver. In addition, a request may be received from the device driver to interface with an operating system.

The operating system attempting to interface with the connected device via the device driver may be analyzed 508. A determination 510 may then be made as to whether the operating system is a host OS. If it is determined 510 that the operating system is a host OS, the operating system may be prevented 512 from interfacing with the connected device. If, however, it is determined 510 that the operating system is not a host OS, the operating system may be allowed 514 to interface with the connected device via the device driver. For example, a guest OS may be allowed 514 to interface with the connected device via the device driver.

Figure 6:
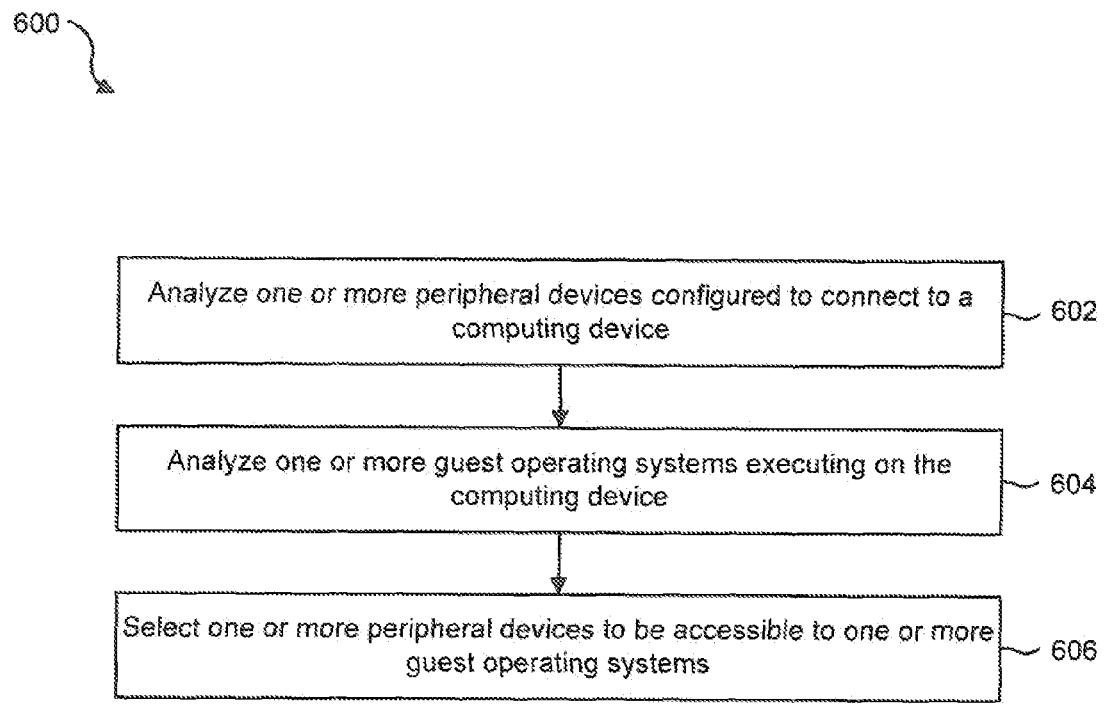
FIG. 6 is a flow diagram illustrating one embodiment of a method for managing access to one or more peripheral devices connected to a computing device.

FIG. 6 is a flow diagram illustrating one embodiment of a method 600 for managing access to one or more peripheral devices connected to a computing device. In one embodiment, the method 600 may be implemented by a management module 112.

In one example, one or more peripheral devices configured to connect to a computing device may be analyzed 602. One or more guest OS running on the computing device may also be analyzed 604. In one configuration, one or more of the peripheral devices may be selected 606 to be automatically accessible by one or more of the guest OSs. As a result, when the selected peripheral devices are connected to a computing device, the one or more guest OSs running on that computing device may automatically have access to the connected peripheral devices.

Figure 7:
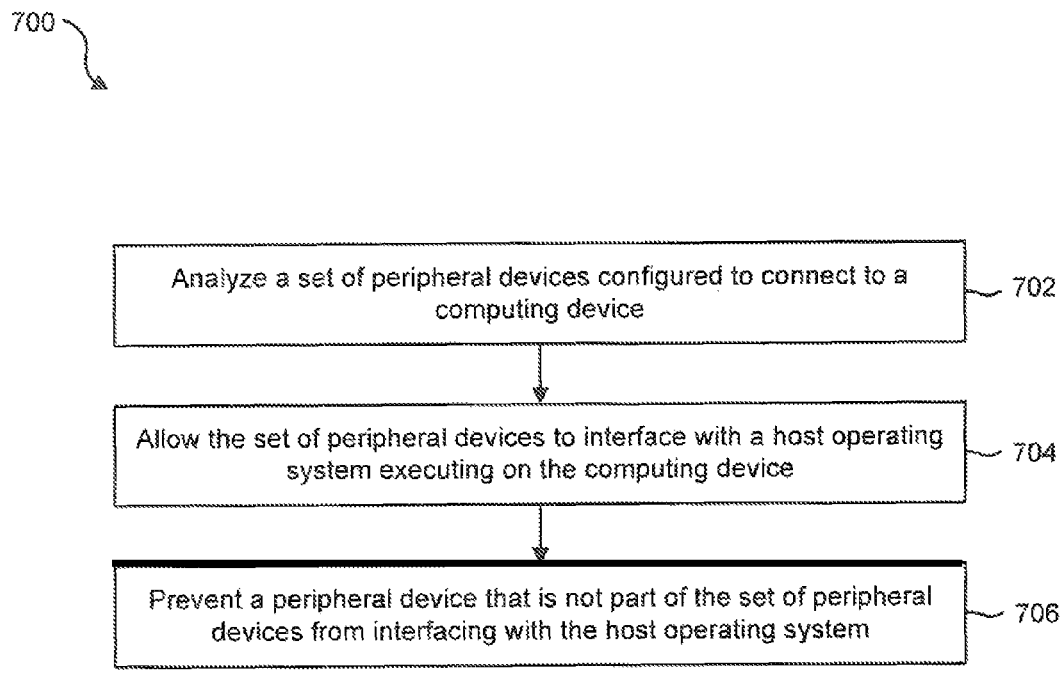
FIG. 7 is a flow diagram illustrating another embodiment of a method for managing the access to peripheral devices connected to a computing device.

FIG. 7 is a flow diagram illustrating another embodiment of a method 700 for managing the access to peripheral devices connected to a computing device. In one configuration, the method 700 may be implemented by a management module 112.

In one embodiment, a set of peripheral devices configured to connect to a computing device may be analyzed 702. In one configuration, the set of peripheral devices may be one or more peripheral devices. The set of peripheral devices may be allowed 704 to interface with a host OS running on the computing device. In addition, a peripheral device that is not part of the set of peripheral devices may be prevented 706 from interfacing with the host OS. As a result, the host OS may be allowed to interface with an approved set of peripheral devices while being isolated from a non-approved peripheral device.

Figure 8:
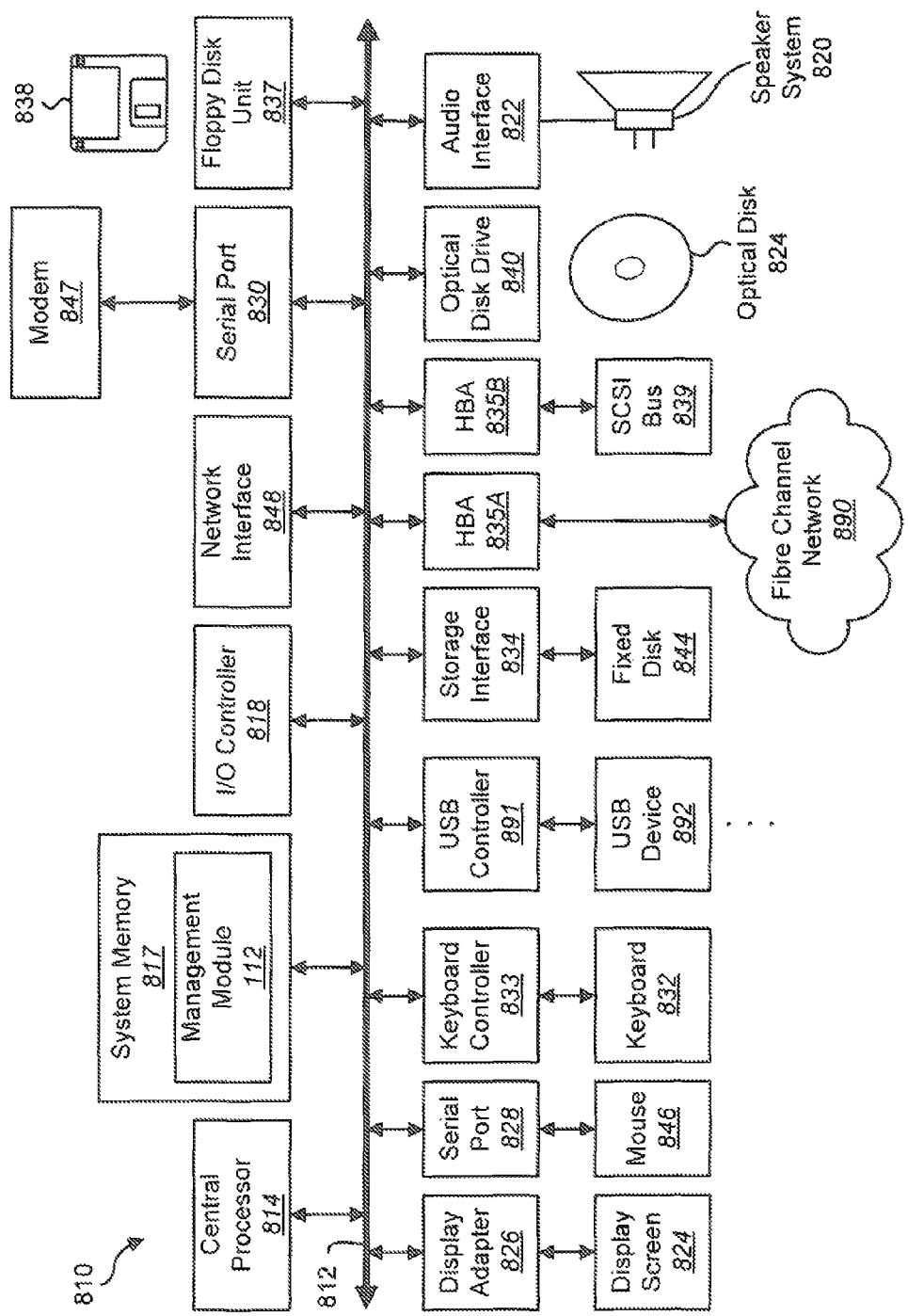
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 890), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the management module 112 to implement the present systems and methods may be stored within the system memory 817. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
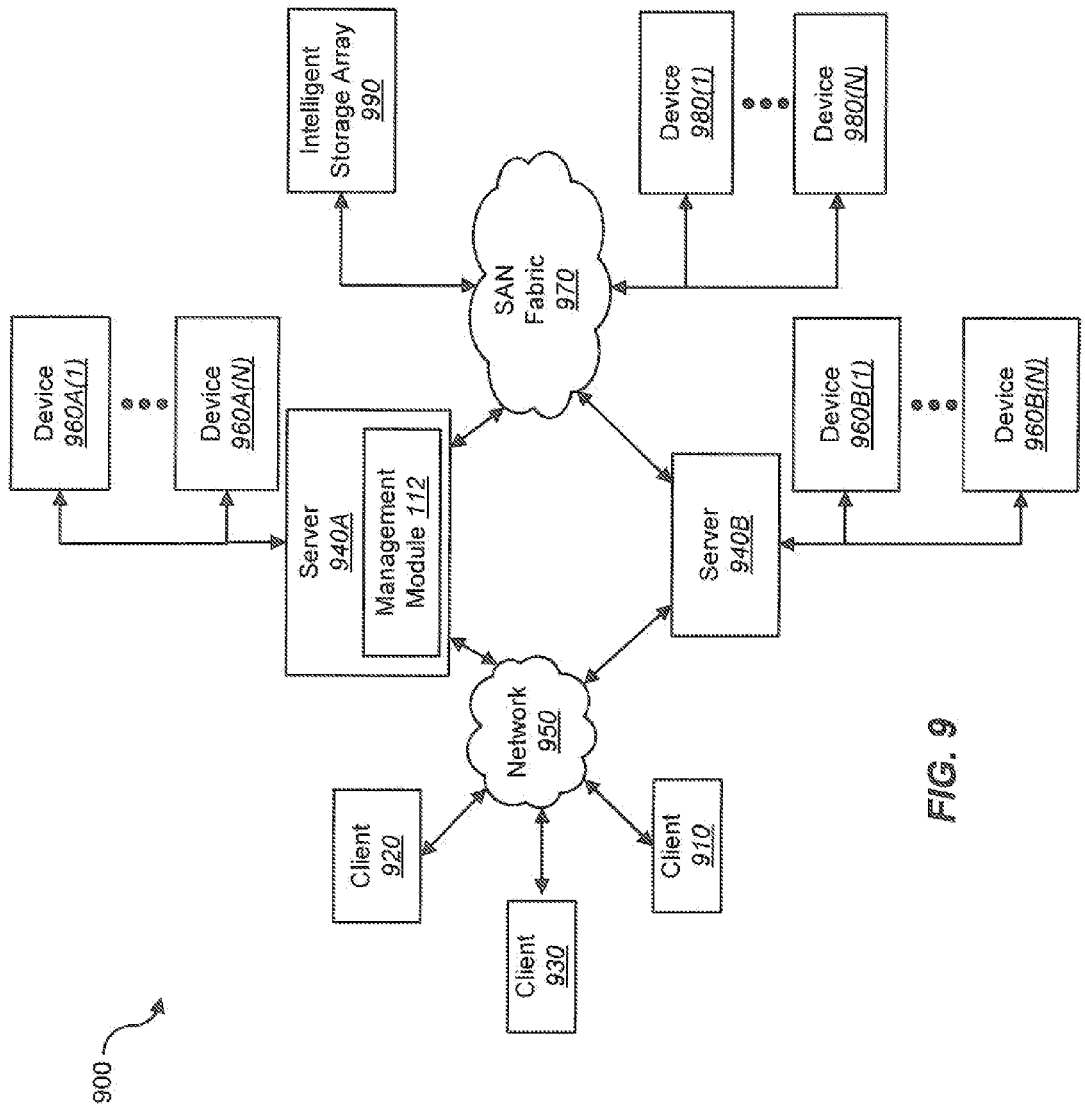
FIG. 9 is a block diagram depicting a network architecture in which client systems, as well as storage servers (any of which can be implemented using computer system), are coupled to a network.

FIG. 9 is a block diagram depicting a network architecture 900 in which client systems 910, 920 and 930, as well as storage servers 940A and 940B (any of which can be implemented using computer system 910), are coupled to a network 950. In one embodiment, the management module 112 may be located within a server 940A, 940B to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920 and 930 to network 950. Client systems 910, 920 and 930 are able to access information on storage server 940A or 940B using, for example, a web browser or other client software (not shown). Such a client allows client systems 910, 920 and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing access to a peripheral device, comprising:
   receiving a request from an operating system to interface with a peripheral device via a device driver of the peripheral device;
   receiving a request from the device driver of the peripheral device to interface with the operating system;
   analyzing the operating system requesting to interface with the peripheral device and analyzing the request received from the device driver;

determining whether the operating system is a host operating system based on the analysis of the operating system and the analysis of the request received from the device driver; and preventing the operating system from interfacing with the peripheral device and preventing the device driver from interfacing with the operating system based on the determination that the operating system is a host operating system.

2. The method of claim 1, further comprising allowing the operating system to interface with the peripheral device if the operating system is a process running on a host operating system.

3. The method of claim 1, further comprising receiving a plurality of requests to interface with the peripheral device from a plurality of operating systems.

4. The method of claim 3, wherein data are stored on the peripheral device.

5. The method of claim 4, wherein the plurality of requests are requests to have read and write capabilities for the data stored on the peripheral device.

6. The method of claim 5, further comprising selecting a single operating system to have read and write capabilities for the data stored on the peripheral device.

7. The method of claim 6, further comprising allowing non-selected operating systems to have read capabilities for the data stored on the peripheral device.

8. The method of claim 1, further comprising selecting one or more peripheral devices to interface with a host operating system.

9. The method of claim 1, further comprising selecting one or more peripheral devices to become accessible to one or more guest operating systems upon connecting the one or more peripheral devices to a connection port of a computing device.

10. A computer system configured to manage access to a peripheral device, comprising:
   a processor;
   memory in electronic communication with the processor;
   a management module, the module configured to:
      receive a request from an operating system to interface with a peripheral device via a device driver of the peripheral device;
      receive a request from the device driver of the peripheral device to interface with the operating system;
      analyze the operating system requesting to interface with the peripheral device and analyze the request received from the device driver;
      determine whether the operating system is a host operating system based on the analysis of the operating system and the analysis of the request received from the device driver; and
      prevent the operating system from interfacing with the peripheral device and prevent the device driver from interfacing with the operating system based on the determination that the operating system is a host operating system.

11. The computer system of claim 10, wherein the management module is further configured to allow the operating system to interface with the peripheral device if the operating system is a process running on a host operating system.

12. The computer system of claim 10, wherein the management module is further configured to receive a plurality of requests to interface with the peripheral device from a plurality of operating systems.

13. The computer system of claim 12, wherein data are stored on the peripheral device.

14. The computer system of claim 13, wherein the plurality of requests are requests to have read and write capabilities for the data stored on the peripheral device.

15. The computer system of claim 14, wherein the management module is further configured to select a single operating system to have read and write capabilities for the data stored on the peripheral device.

16. The computer system of claim 15, wherein the management module is further configured to allow non-selected operating systems to have read capabilities for the data stored on the peripheral device.

17. The computer system of claim 10, wherein the management module is further configured to select one or more peripheral devices to interface with a host operating system.

18. The computer system of claim 10, wherein the management module is further configured to select one or more peripheral devices to become accessible to one or more guest operating systems upon connecting the one or more peripheral devices to a connection port of the computer system.

19. A computer-program product for managing access to a peripheral device, the computer-program product comprising a non-transitory computer-readable medium having instructions thereon, the instructions comprising:
   code programmed to receive a request from an operating system to interface with a peripheral device via a device driver of the peripheral device;
   code programmed to receive a request from the device driver of the peripheral device to interface with the operating system;
   code programmed to analyze the operating system requesting to interface with the peripheral device and analyze the request received from the device driver;
   code programmed to determine whether the operating system is a host operating system based on the analysis of the operating system and the analysis of the request received from the device driver; and
   code programmed to prevent the operating system from interfacing with the peripheral device and prevent the device driver from interfacing with the operating system based on the determination that the operating system is a host operating system.

20. The computer-program product of claim 19, wherein the instructions further comprise code programmed to allow the operating system to interface with the peripheral device if the operating system is a process running on a host operating system.

* * * * *